Dec. 13, 1927.  
H. E. MONTGOMERY  
SPOTLIGHT  
Filed Nov. 13, 1925  
1,652,452  
4 Sheets-Sheet 1
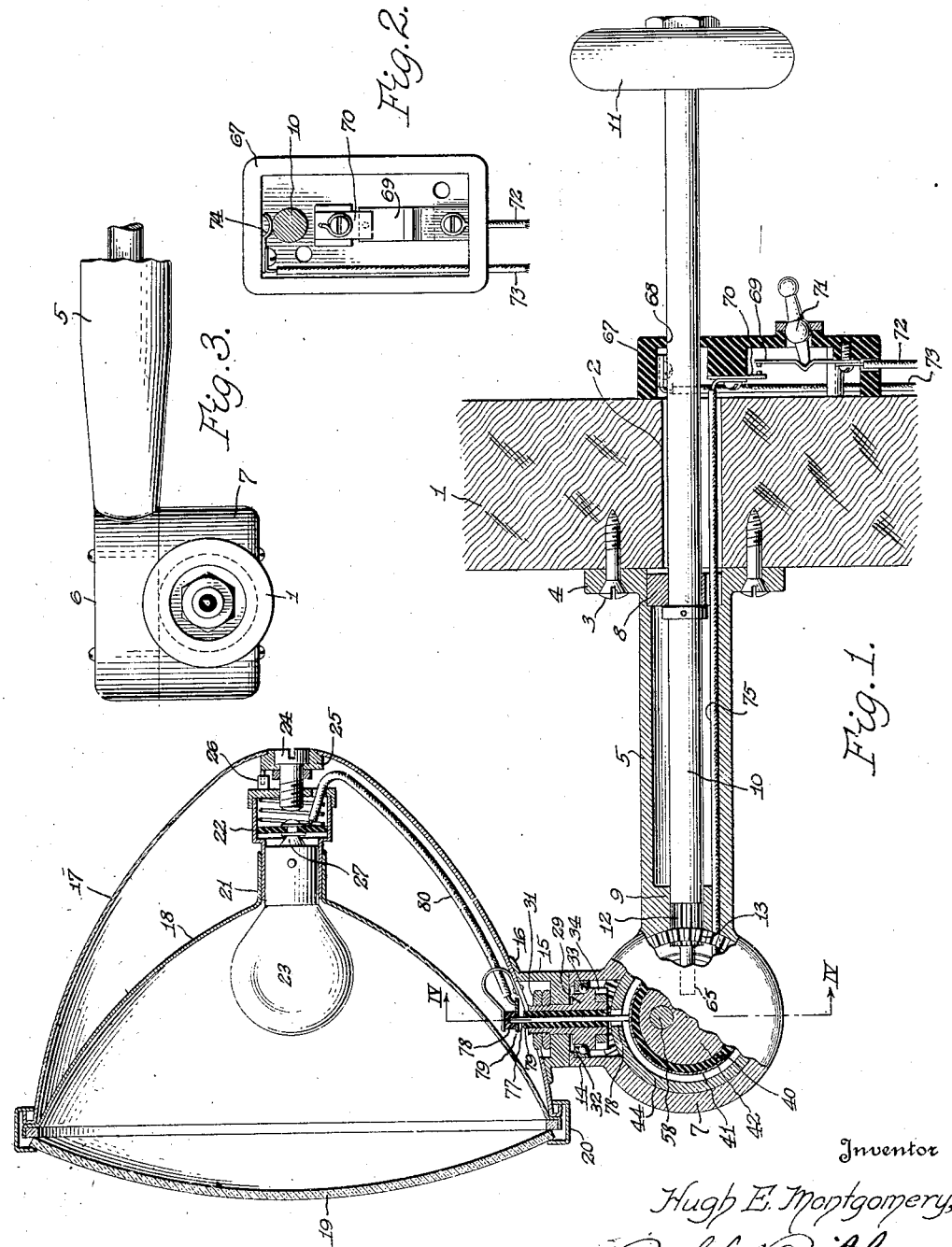
Inventor  
Hugh E. Montgomery,  
By  
Attorneys Dec. 13, 1927.
H. E. MONTGOMERY
SPOTLIGHT
Filed Nov. 13, 1925
1,652,452
4 Sheets-Sheet 2
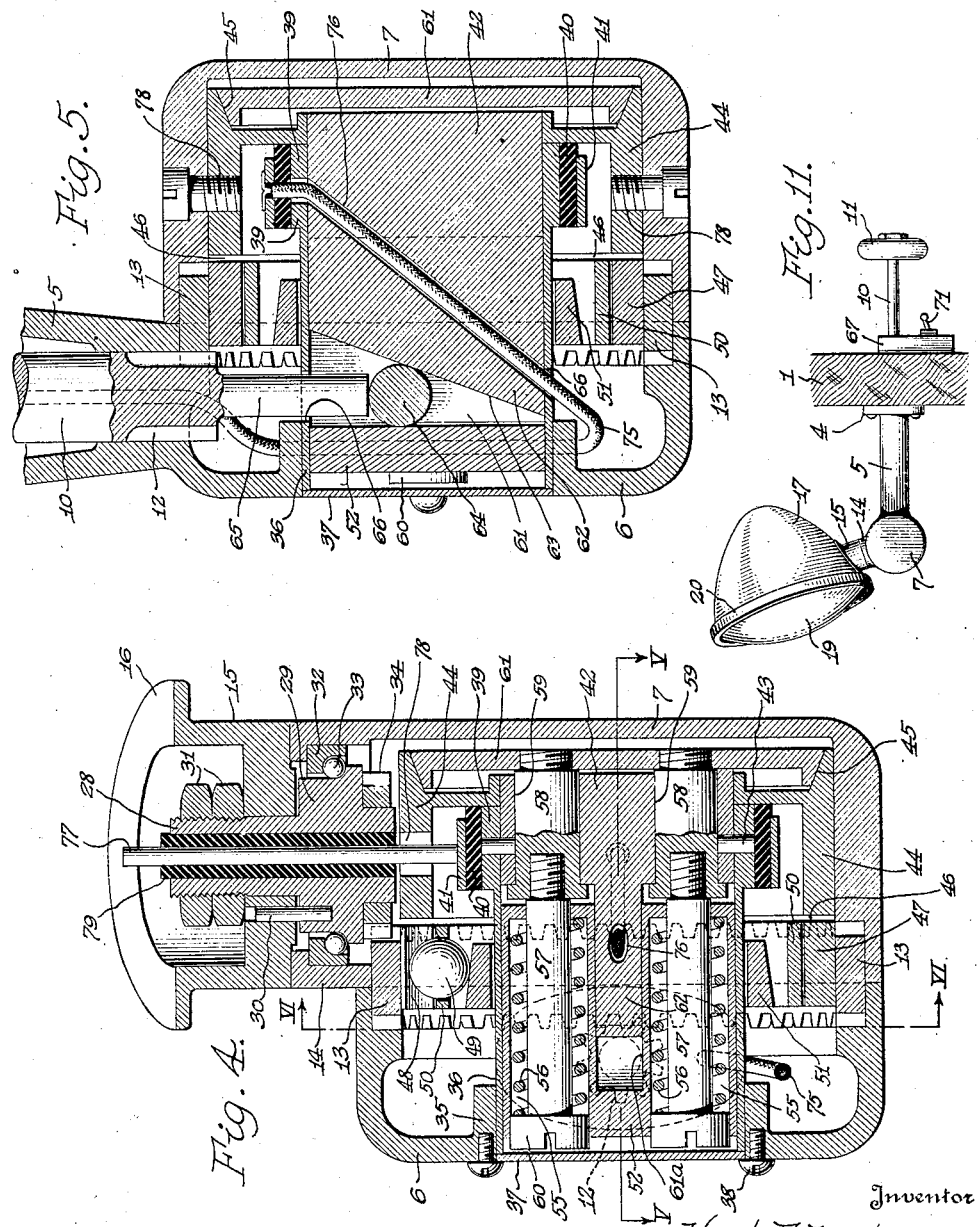
Inventor
Hugh E. Montgomery,
By
Attorneys Dec. 13, 1927.  1,652,452
H. E. MONTGOMERY
SPOTLIGHT
Filed Nov. 13, 1925  4 Sheets-Sheet 3
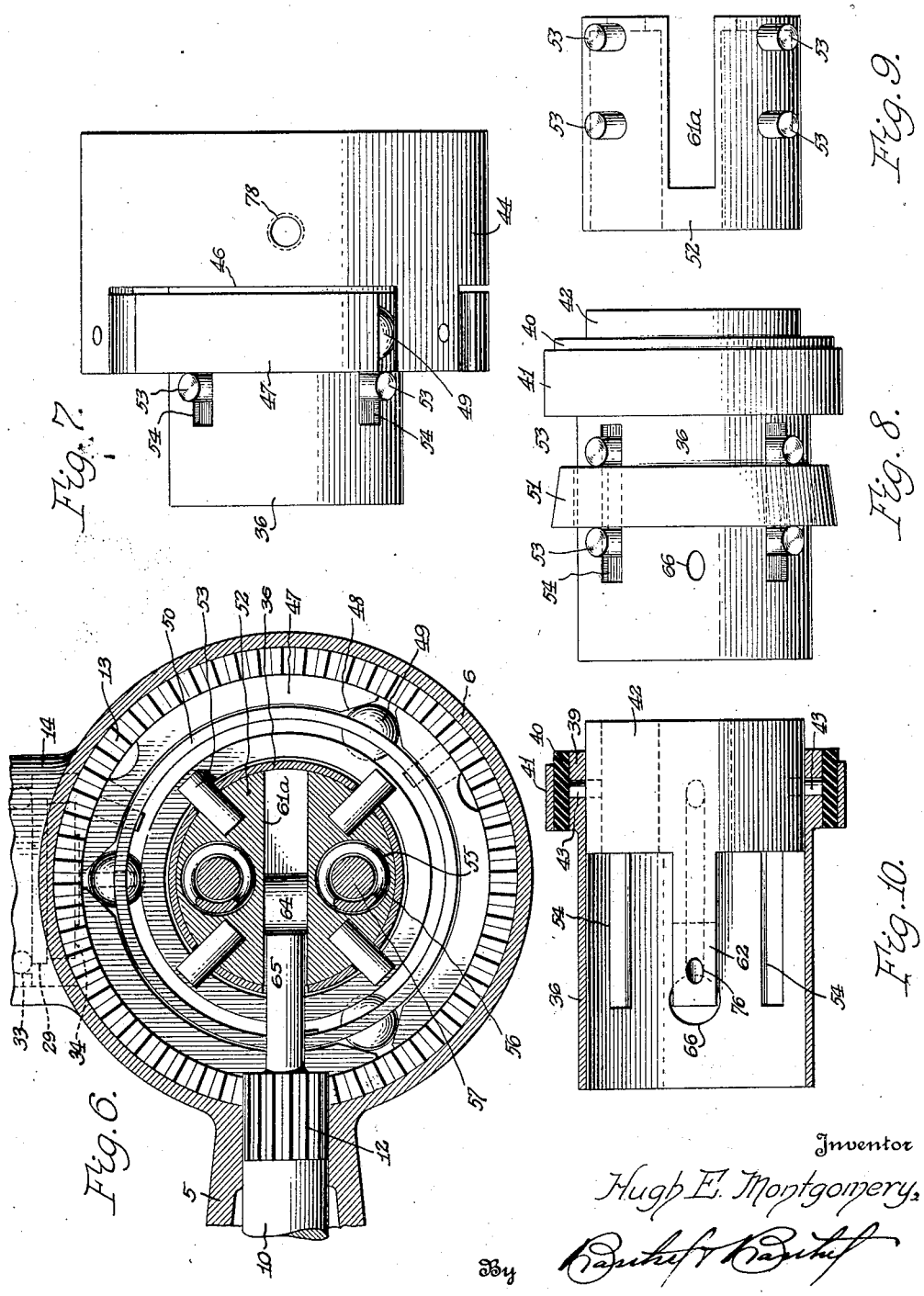
Inventor
Hugh E. Montgomery,
By
Attorney Dec. 13, 1927.
H. E. MONTGOMERY
SPOTLIGHT
Filed Nov. 13, 1925
1,652,452
4 Sheets-Sheet 4
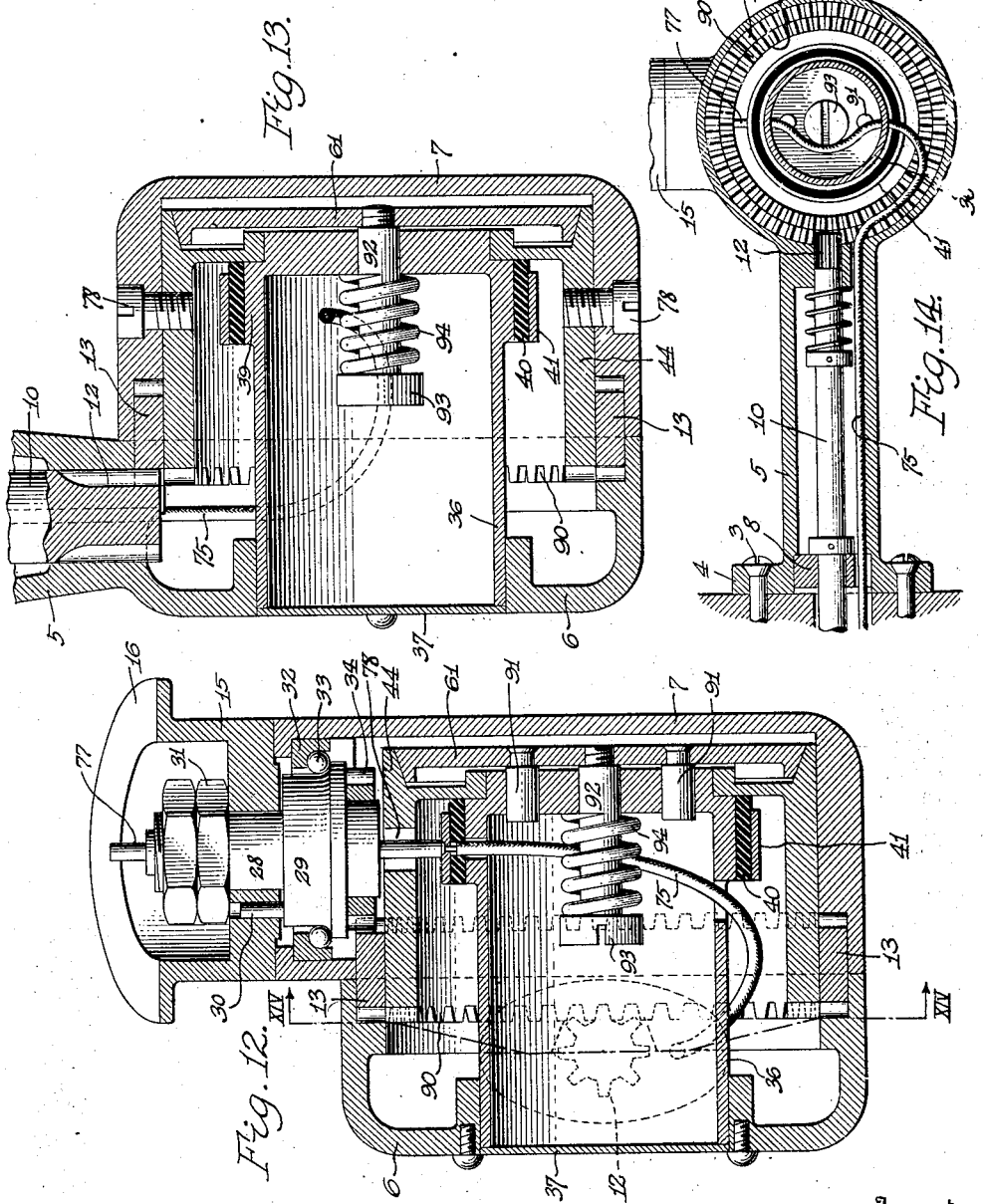
Inventor
Hugh E. Montgomery,
By
Attorneys Patented Dec. 13, 1927.

1,652,452

UNITED STATES PATENT OFFICE.

HUGH E. MONTGOMERY, OF DETROIT, MICHIGAN, ASSIGNOR TO MONTGOMERY BROS. INC., OF DETROIT, MICHIGAN, A CORPORATION OF MICHIGAN.

SPOTLIGHT.

Application filed November 13, 1925. Serial No. 68,814.

This invention relates to spot lights for automobiles and other vehicles and has special reference to that class of dirigible lanterns or adjustable lamps that may be manually adjusted to cast a ray or beam of light in a desired direction. Mechanism providing a universal movement is employed and the principle involved in this invention is applicable to search lights, signal lamps and various types of illuminating devices.

My invention has been particularly designed for an electrically operated spot light that may be carried by the front part of an automobile convenient to the driver or chauffeur of the automobile. The lamp includes a mechanism which will permit of the automobile driver rotating the lamp in a horizontal plane about a vertical axis, so that a ray of light may be cast to one side or the other of the automobile. The mechanism also permits of the lamp being swung in a vertical plane about an axis transverse to the lamp support whereby a ray of light may be cast upwardly or downwardly. The mechanism for producing these two independent movements is so related that the lamp may be adjusted to cast its ray of light downwardly or upwardly at either side of the vertical plane and it is by virtue of such adjustment that any spot within the vicinity of the front end of an automobile may be illuminated. It is obvious that such adjustments may be advantageously used in connection with a signal lamp where the wigwagging of a beam of light in various directions may indicate signals.

The adjusting mechanism for the lamp is compactly assembled in an element excluding housing and in addition to the mechanism providing the usual electrical connections for the lamp, there is an organization of elements by which the lamp will be positively held in adjusted position against accidental movement during the operation of an automobile; means by which the focus of the lamp may be adjusted, and means by which the electrical operation of the lamp may be controlled at will.

The detail construction of the complete spot light will be hereinafter specifically described and then claimed, and reference will now be had to the drawings, wherein there is illustrated the preferred embodiments of my invention, but in describing the details of construction and the arrangement of parts it is to be understood that the structural elements are susceptible to such changes, in size, shape and manner of assembly, as are permissible by the appended claims.

Figure 1 is a longitudinal sectional view of the spot light;

Fig. 2 is a rear elevation of a detached switch;

Fig. 3 is a plan of a portion of the spot light, the lamp being removed;

Fig. 4 is an enlarged vertical sectional view taken on the line IV—IV of Fig. 1;

Fig. 5 is a horizontal sectional view taken on the line V—V of Fig. 4;

Fig. 6 is a cross sectional view taken on the line VI—VI of Fig. 4;

Fig. 7 is a plan of a stationary clutch member forming part of the spot light mechanism;

Fig. 8 is a plan of a support for the clutch member;

Fig. 9 is a plan of an actuating member;

Fig. 10 is a longitudinal sectional view of the support shown in Fig. 8;

Fig. 11 is a side elevation of the spot light showing the lamp in adjusted position;

Fig. 12 is a vertical sectional view illustrating a modified form of spot light;

Fig. 13 is a horizontal sectional view of the same, and

Fig. 14 is a cross sectional view taken on the line XIV—XIV of Fig. 12.

In the drawing, the reference numeral 1 denotes a support having an opening 2 and secured to the outer side of said support by screws 3 or other fastening means is the inner flanged end 4 of a tubular bracket 5. On the outer end of the bracket 5 is a substantially cylindrical housing 6 and adjustable at one side of said housing is a substantially cylindrical casing 7, said housing and casing being in matched relation so that the outer end of the bracket may be finished to present a neat appearance.

Mounted in the inner end of the bracket 5 is a bushing 8 which cooperates with a bearing portion 9 at the outer end of the bracket in supporting an operating shaft 10 which extends through the opening 2 of the support 1 and has its inner end provided with a hand wheel 11 by which the shaft 10 may be rotated and reciprocated. The outer end of the shaft 10 is finished to provide a long pinion 12 and constantly meshing with said pinion is a double ring gear 13 journaled partly in the housing 6 and partly within the casing 7, as best shown in Figs. 4 and 5.

The casing 7 has a radially disposed connection 14 and rotatable on said connection is a socket 15 having a peripheral flange 16 to which is suitably secured a lamp casing 17. The lamp casing is provided with a conventional form of reflector 18 and a lens or transparent cover 19 which together with the reflector 18 are held in place by a retaining ring 20. In the reflector is a concentric guide and support 21 for a socket 22 provided with an incandescent lamp 23. The socket 22 is slidably mounted in the support 21 and may be adjusted by a screw 24 to regulate the focus of the lamp 23. The screw 24 is rotatably mounted in a holder 25 attached to the lamp casing 17 and by rotating the screw 24 the socket 22 may be shifted one way or the other in the support 21. The socket 22 is prevented from rotating by contact lugs 26 carried by the holder 25 and said socket, and in the socket is a spring pressed contact 27 for one of the terminals of the lamp 23. The electrical connections for the lamp will be hereinafter considered.

Axially of the rotatable socket 15 is a tubular coupling member 28 provided with an inner race member 29 which is pinned, as at 30, to the socket 15 with the pin mounted in the race member 29 and extending into the socket 15 for adjustment therein when it becomes necessary to shift the coupling member 28 by nuts 31 screwed on the coupling member and housed within the socket 15. The race member 29 cooperates with an outer race member 32 and anti-frictional balls 33 in rotatably supporting the socket 15, particularly when the socket is in other than a vertical position.

On the inner end of the coupling member 28 is a gear wheel 34 meshing with the ring gear 13, and now it is apparent that the shaft 10 may be rotated in either direction to revolve the gear ring 13, the coupling member 28, the socket 15, and the lamp attached thereto, so that said lamp may be swung in a horizontal plane about the axis of the coupling member 28 when said coupling member is in a vertical position. Irrespective of its position relative to the housing 6 the lamp may be rotated about the axis of the coupling member, and it is through this coupling member that electrical connections are established for the lamp, as will hereinafter appear.

The housing 6 has an opening surrounded by a collar 35 and mounted in the housing opening and supported by the collar 35 is a hollow cylindrical support 36 which has its outer end normally closed by an end plate 37 set in the housing opening and retained therein by screws 38 or other fastening means.

The inner end of the cylindrical housing 36 is formed with an annular seat 39 for an insulation ring 40 on which is mounted a contact ring 41, and mounted in the inner end of the support 36 is a guide member 42 retained therein by radially disposed pins 43 entering the seat 39 of the support 36.

The guide member 42 is somewhat in the form of a plug which closes the inner end of the support 36, and mounted on the protruding end of the guide 42 is a clutch member 44 provided with a conical end clutch face 45. The opposite end of the clutch member 44 is cut away, as at 46, to provide clearance for a plurality of shoes 47 which are segment shaped in side elevation and are adapted to frictionally engage and bear against the inner wall of the double ring gear 13. These shoes 47 are formed with beveled confronting ends 48 between which are disposed anti-frictional balls or roller members 49 arranged in a cylindrical cage 50. The cage 50 supports the anti-frictional balls 49 on a tapered ball projecting member 51 in the form of an annulus surrounding the support 36 and adapted to be shifted longitudinally thereof. The ball projecting member 51 tapers inwardly from its outer end towards its inner end and when the ball protecting member is shifted towards the seat 39 of the support 36 the balls 49 are distended and in turn spread and distend the shoes 47, whereby said shoes frictionally engage the ring gear 13 to rotate therewith.

Slidably mounted in the supporting member 36 in opposed relation to the guide 42 is an actuating member 52 provided with sets of radially disposed pins 53 extending through longitudinal slots 54 of the support 36 to engage opposite sides of the ball projecting member 51, as best shown in Fig. 8.

In the actuating member 52 are bores 55 for coiled expansion springs 56 which encircle studs 57 carried by coupling bolts 58 slidable in openings 59 provided therefor in the guide 42. The studs 57 have large heads 60 which slidably fit in the bores 55 and said studs are preferably screwed into the coupling bolts 58, which in turn are screwed into a clutch or drag member 61 in operative relation to the clutch member 44.

The actuating member 52 has a slot 61$^a$ and extending therein is the beveled tongue 62 of the guide member 42. The tongue 62 has a beveled face 63 cooperating with a vertical end wall of the slot 61$^a$ in providing a substantially V-shaped pocket for a roller 64 engaged by the reduced end 65 of the shaft 10, said reduced end of the shaft extending through an opening 66 provided therefor in the support 36.

Before describing the electrical connections for the lamp, it is thought best to review the two operations involved when adjusting the lamp. As set forth in the beginning, the lamp can be adjusted about the axis of the coupling member 28 irrespective of the position of the casing relative to the housing 6, and to accomplish this adjustment it is necessary to push outwardly on the shaft 10. Such movement of the shaft does not destroy the driving relation between the pinion 12 and the ring gear 13, but causes the reduced end 65 of the shaft to force the roller 64 between the actuating member 52 and the guide member 42. Since the guide member 42 is fixed relative to the stationary support 36, the actuating member 52 must give way and in so doing the springs 56 are placed under additional tension, and the ball projecting member 51 is shifted outwardly by the sets of pins 53 carried by the actuating member 52. Outward movement of the actuating member 52 permits the balls 49 to recede and release the shoes 47 relative to the ring gear, so that the ring gear 13 may be rotated by the shaft 10 to impart rotation to the coupling member 28, the socket 15, and the lamp carried thereby. The rotation of the shaft 10 must be accomplished while said shaft is held in a distended position against the expansive force of the springs 56. These springs having been placed under compression exert an outward force against the studs 57 and by virtue of the coupling bolts 58 the clutch or drag member 61 is clamped against the clutch member 44 and the lamp will remain in the position to which it is shifted, because when the hand releases the shaft 10 said shaft is restored to normal position by the roller 64 riding the inclined face of the guide 42. This is brought about by the expansive force of the springs 56 restoring the actuating member 52 to normal position, but the springs 56 are still under tension causing clutch or drag members 61 to bear against the clutch member 44. Retraction of the actuating member 52 to normal position has caused this member to shift the ball projecting member 51, distend the balls 49, and frictionally secure the shoes 47 against the ring gear 13. It is therefore obvious that the binding action of these various parts under the influence of the springs 56 holding the drag member 61 against the clutch member 44 will prevent accidental rotation of the lamp incident to vibrations to which it may be subjected when used in connection with an automobile.

Thus far I have described the cooperation of the various elements by which the lamp may be adjusted about the axis of the coupling member 28. If it is desired to swing the casing 7 about the axis of the stationary housing 6, it is only necessary to rotate the shaft 10 without pushing outwardly or reciprocating the same. Rotation of the shaft 10 causes the ring gear 13 to be revolved with the housing 6 serving as a bearing for the ring gear, and the casing 7 will remain stationary on the ring gear so that the casing may be swung about the axis of the housing 6. When the ring gear 13 is revolved it carries with it the clutch member 44, the shoes 47, the balls 49 and their cage 50, and the tapered ball projecting member 51. All of these elements are free to revolve with the ring gear 13, but against the braking or dragging action of the member 61 against the clutch member 44. It is therefore obvious that if the shaft 10 is released that the casing 7 will remain in its adjusted position and when in such position the shaft 10 may be pushed outwardly and rotated to accomplish adjustment of the lamp about the axis of the coupling member 28.

The drag or clutch member 61 at all times exerts pressure against the clutch member 44 and these two elements serve as a common locking means for the lamp after each adjustment.

The electrical equipment includes a switch casing 67 made of insulation material and mounted against the support 1, said casing having an opening 68 so that the shaft 10 may extend through the casing. In the casing is a resilient contact arm 69 that may be sprung into engagement with a fixed contact arm 70 by a fulcrumed lever 71 normally engaging the resilient contact arm 69. Extending into the casing 67 are leading-in conductors 72 and 73 from a suitable source of electrical energy and the leading-in conductor 72 is connected to the resilient contact arm 69, while the leading-in conductor 73 is connected to a resilient contact arm 74 constantly engaging the shaft 10.

Connected to the fixed contact member 70 is a conductor 75 which extends through the opening 2 of the support 1, the bushing 8, the bracket 5, the bearing 9 and into the housing 6. From the housing 6 the conductor 75 extends through an opening in the support 36 and through an angularly disposed opening 76 in the guide member 42. See Fig. 5. The end of the conductor 75 extends out of the support 36 through the seat 39 and the insulation ring 40 and is attached to the contact ring 41. Constantly engaging the contact ring 41 is a pin 77 extending through an opening 78 in the clutch member 44 and through a tubular insulator 79 mounted in the tubular coupling member 28. The pin 77 extends into the lamp casing 17 and mounted on the upper end of said pin is a spring pressed insulator head 78 having a piece 79 contacting with the pin 77. Connected to the piece 79 is a short conductor 80 extending into the socket 22 and connected to the contact 27.

With the leading-in conductor 73 electrically connected to the shaft 10 the other leg of the circuit is completed through metallic parts of the spot light mechanism.

Reference will now be had to Figs. 12 to 14 inclusive illustrating what may be considered a simplified construction compared to that previously described. In this simple form I dispense with the shoes 47, the balls 50, the ball projecting member 51, the pins 53, and practically all of the elements in the hollow cylindrical support 36. In lieu of these elements I form a clutch member 44 with a toothed end 90 which is within the ring gear 13 so that the long pinion 12 may be shifted to engage only the ring gear 13 or said ring gear and the toothed end 90 of the clutch member 44. When in engagement with the ring gear 13 alone the lamp will be turned about the axis of the coupling member 28 and when in engagement with the ring gear and the toothed end of the clutch member, both will be rotated in synchronism causing the casing 7 to be adjusted relative to the housing 6.

To hold the drag or clutch member 61 in an operative relation to the clutch member 44, the drag member 61 is provided with guide pins or studs 91 extending into the end of the support 36. Centrally of the drag or clutch member 61 is a stud 62 slidable in the end of the support 36 and provided with a head 93 within the support serving as an abutment for a coiled-expansion spring 94, which holds the drag member 61 against the clutch member 44.

The conductor 73 may be carried into the support 36 and to the contact ring 41, or it may be connected to the contact ring by being arranged between the support 36 and the clutch member 44.

It is thought that the operation of this simplified form of construction will be apparent without further description, and of course I reserve the right to use either form that may fall within the scope of the following claims.

What I claim is:—

1. In a spot light, the combination with a fixed bracket, and an adjustable electrically illuminated lamp at the outer end of said bracket, of a rotatable casing supported from the outer end of said bracket, a rotatable socket on said casing and supporting said lamp, a coupling member in said casing adapted for imparting rotation to said socket, a ring gear extending into said casing adapted to rotate said coupling member, a toothed clutch member having its teeth in the same plane as the teeth of said ring gear, and a toothed shaft extending through said bracket with its teeth meshing with said ring gear and adapted to engage the teeth of said clutch member.

2. In a spot light wherein a bracket supports an adjustable electrically illuminated lamp adapted to be swung in a plane at a right angle to the axis of said bracket and rotated relative to an axis at an angle to the bracket axis, and wherein a rotatable and reciprocable shaft is adapted for adjusting said lamp;—mechanism operatable by said shaft for effecting adjustment of said lamp, said mechanism including a housing on said bracket, a rotatable casing at the side of said housing and on which casing said lamp is rotatably supported, a ring gear in said housing and casing operatable by said shaft to either impart rotation to said lamp relative to said casing or bodily adjust said casing and lamp relative to said housing, and means controlled by reciprocation of said shaft adapted to adjust said casing relative to said ring gear for rotation therewith, the last mentioned means including shoes engaging said ring gear, a clutch, and spring actuated means by which said clutch and shoes cooperate in holding said casing for rotation with said ring gear.

3. In a spot light wherein a bracket supports an adjustable electrically illuminated lamp adapted to be swung in a plane at a right angle to the axis of said bracket and rotated relative to an axis at an angle to the bracket axis, and wherein a rotatable and reciprocable shaft is adapted for adjusting said lamp;—mechanism operatable by said shaft for effecting adjustment of said lamp, said mechanism including a housing on said bracket, a rotatable casing at the side of said housing and on which casing said lamp is rotatably supported, a ring gear in said housing and casing operatable by said shaft to either impart rotation to said lamp relative to said casing or bodily adjust said casing and lamp relative to said housing, a clutch in said casing, a drag member engaging said clutch, shoes normally engaging said ring gear, spring actuated means establishing an operative relation between said shoes and drag member for holding said ring gear against accidental rotation, and means operatable by reciprocation of said shaft adapted to effect said spring actuated means to release said shoes relative to said ring gear and permit of said ring gear adjusting said lamp independent of said casing.

4. A spot light mechanism as called for in claim 3, wherein said spring actuated means includes an actuating member, a ball projecting member adapted to be shifted by said actuating member, and a series of balls interposed between said shoes and said actuating member.

5. A spot light mechanism as called for in claim 3, wherein said spring actuated means includes an actuating member, studs in said actuating member connected to said drag member, springs in said actuating member pressing against said studs, and means shiftable by said actuating member to effect movement of said shoes relative to said ring gear.

6. In a spot light wherein a bracket supports an adjustable electrically illuminated lamp adapted to be swung in a plane at a right angle to the axis of said bracket and rotated relative to an axis at an angle to the bracket axis, and wherein a rotatable and reciprocable shaft is adapted for adjusting said lamp;— mchanism operatable by said shaft for effecting adjustment of said lamp, said mechanism including a housing on said bracket, a rotatable casing at the side of said housing and on which casing said lamp is rotatably supported, a support carried by said housing and extending into said casing, a ring gear in said housing and casing constantly geared with said shaft and adapted to be driven from said shaft for rotating said lamp on said casing, and means within said ring gear engageable by reciprocation of said shaft for rotation with said casing, said means being releasable by reciprocation of said shaft to permit of said lamp being rotated on said casing.

7. In a spot light wherein a bracket supports an adjustable lamp adapted to be swung in a plane at a right angle to the axis of said bracket and rotated relative to an axis at an angle to the bracket axis, and wherein a rotatable and reciprocable shaft in said bracket is adapted for adjusting said lamp; supporting means for said lamp relative to said bracket, said supporting means comprising a housing, a casing, a rotatable lamp supporting socket on said casing, a ring gear journaled in said housing and supporting said casing and operatable by said shaft for either rotating said casing relative to said housing or said lamp supporting socket relative to said casing, a support carried by said housing, and extending into said casing, clutch mechanism in said casing, means between said support and said ring gear cooperating with said clutch mechanism in holding said casing and the lamp supporting socket against accidental rotation, and means in said support operatable by reciprocation of said shaft to release said means relative to said ring gear so that said ring gear may rotate said lamp supporting socket independent of said casing.

8. A spot light mechanism as called for in claim 7, wherein the last mentioned means includes an actuating member articulated with said clutch mechanism and constantly under the spring pressure.

9. In a spot light, a housing, a casing rotatably supported from said housing, a lamp supporting socket rotatable on said casing, a ring gear in said housing and casing adapted for rotating either said casing or said lamp supporting socket, a clutch member in said casing, a drag member normally engaging said clutch member and adapted to cooperate therewith in preventing accidental rotation of said casing or the lamp socket thereon, means in said casing articulated with said drag member and adapted to control the rotation of said ring gear whereby said ring gear may revolve in said housing for rotation of said casing or revolve in said housing and casing for rotation of said lamp supporting socket, and means extending into said housing for imparting rotation to said ring gear and controlling the last mentioned means.

10. In a spot light, the combination with a fixed bracket, and an adjustable electrically illuminated lamp at the outer end of said bracket, of a housing on the outer end of said bracket, a rotatable casing supported from said housing, a rotatable lamp supported from said casing, a ring gear in said housing adapted for rotating said lamp relative to said casing, a toothed clutch member in said ring gear and having its teeth in the same plane as the teeth of said ring gear, and means extending through said bracket into said housing constantly engaging said ring gear for adjusting said lamp relative to said casing and shiftable into engagement with the teeth of said clutch member and adjustable with said ring gear for adjusting said casing relative to said housing.

11. In a spot light wherein a bracket supports an adjustable casing with an adjustable lamp thereon, a mechanism for optionally adjusting either said lamp or said lamp and casing together, said mechanism including a ring gear, a clutch member concentric of said ring gear, teeth on one end of said clutch member in matched registration with the teeth of said ring gear, means engaging the opposite end of said clutch member to effect a drag thereon so that said ring gear may be rotated relative to said clutch member, and means reciprocable and rotatable in a plane at an angle to the axis of said ring gear, and adapted to mesh with the teeth of the ring gear alone to effect rotation of said lamp on said casing or mesh with the teeth of said ring gear and clutch member to effect bodily adjustment of said lamp and casing relative to said bracket.

In testimony whereof I affix my signature.

HUGH E. MONTGOMERY.